United States Patent
Rombeaut et al.

(10) Patent No.: US 7,680,030 B2
(45) Date of Patent: *Mar. 16, 2010

(54) ROUTER PROVIDING CONTINUITY OF SERVICE OF THE STATE MACHINES ASSOCIATED WITH THE NEIGHBORING ROUTERS

(75) Inventors: Jean-Pierre Rombeaut, Maubeuge (FR); Yves Saintillan, Massy (FR)

(73) Assignee: Alcatel Lucent, Paris (FR)

( * ) Notice: Subject to any disclaimer, the term of this patent is extended or adjusted under 35 U.S.C. 154(b) by 304 days.

This patent is subject to a terminal disclaimer.

(21) Appl. No.: 11/626,146

(22) Filed: Jan. 23, 2007

(65) Prior Publication Data

US 2007/0115807 A1    May 24, 2007

Related U.S. Application Data

(63) Continuation of application No. 10/042,177, filed on Jan. 11, 2002, now Pat. No. 7,177,269.

(30) Foreign Application Priority Data

Jan. 11, 2001  (FR)  ................... 01 00 306

(51) Int. Cl.
    *H04J 3/14*   (2006.01)
(52) U.S. Cl. ..................... 370/219; 370/401
(58) Field of Classification Search ................ 370/401, 370/216, 217, 218, 219, 220, 241, 242, 244, 370/252
    See application file for complete search history.

(56) References Cited

U.S. PATENT DOCUMENTS

| 5,473,599 | A | 12/1995 | Li |
| 5,835,696 | A * | 11/1998 | Hess ........................ 714/10 |
| 6,049,524 | A | 4/2000 | Fukushima |
| 6,073,184 | A | 6/2000 | Couturier |
| 6,148,410 | A * | 11/2000 | Baskey et al. ................ 714/4 |
| 6,577,634 | B1 | 6/2003 | Tsukakoshi |
| 6,931,452 | B1 * | 8/2005 | Lamberton et al. .......... 709/242 |
| 2002/0167952 | A1 | 11/2002 | Watson |
| 2002/0186653 | A1 | 12/2002 | Jensen |
| 2003/0046604 | A1 | 3/2003 | Lau |
| 2003/0056138 | A1 | 3/2003 | Ren |

FOREIGN PATENT DOCUMENTS

WO    02-47329 A2    6/2002

OTHER PUBLICATIONS

J. Moy, "IETF Std. 54 9RFC 2328" OSPF Version 2, Apr. 1998, IETF XP002176606.

* cited by examiner

*Primary Examiner*—Brian D Nguyen
(74) *Attorney, Agent, or Firm*—Sughrue Mion, PLLC

(57) ABSTRACT

A router made up firstly of at least two router modules, only one of which is in an active state at any given time, and secondly a of changeover device making it possible to cause one of the other router modules to go from a standby state to an active state when the router module in the active state stops, and the router modules having state machines associated with each of the neighbor routers, wherein each of the router modules has a data storage device which, in the active state, enables it to store data relating to the states of the state machines, when the machines are in stable states, and a data retrieval device for retrieving the data when the router module changes over to the active state.

24 Claims, 2 Drawing Sheets

őROUTER PROVIDING CONTINUITY OF
SERVICE OF THE STATE MACHINES
ASSOCIATED WITH THE NEIGHBORING
ROUTERS

This is a continuation of application Ser. No. 10/042,177 (now U.S. Pat. No. 7,177,269) filed Jan. 11, 2002. The entire disclosure of the prior application, application Ser. No. 10/042,177, is hereby incorporated by reference.

The present invention relates to continuity of the routing service in a network of the Internet Protocol (IP) type. More precisely, the invention can be applied particularly well to the Open Shortest Path First (OSPF) protocol, as defined in the Request For Comments (RFC) 2328 of the Internet Engineering Task Force (IETF).

BACKGROUND OF THE INVENTION

The OSPF protocol is a protocol of the Transmission Control Protocol/Internet Protocol (TCP/IP) family making it possible for the routing systems or "routers" of an Internet network to have sufficient knowledge of the network to route the received packets correctly to their destinations.

The particularity of the OSPF protocol is that it is a dynamic routing protocol, i.e. it is capable of taking account of changes in the topology of the network in dynamic manner. For this purpose, the protocol has steps in which messages are exchanged periodically, in order to update constantly the knowledge that each router possesses of the network or of a portion of the network.

A router has connections with other routers. These connections can be of various types, such as:

point to point networks;

multi-access networks, e.g. of the Ethernet™ type; and stub networks making it possible to interconnect a set of host stations.

As a function of the type of connection and of the status of the router, it can be necessary to put the router into adjacency with another router.

Putting two routers into adjacency consists in ensuring that they share exactly the same data about the topology of the network.

In some cases, it is not necessary to put two routers into adjacency. For example, in a multi-access network, for optimization reasons, adjacency is implemented only between each router and a router that is elected to be the designated router.

In the OSPF protocol, the designated router $R_1$ exchanges various types of messages with the neighboring routers, such as Database Description Packet (DDP) messages, "Hello" messages, data transmission (Link State (LS) Update) messages, data request (LS Request) messages, and acknowledgement of receipt (LS Acknowledgement) messages.

The object of the "Hello" messages is to inform the other routers periodically that the issuer of the message is still active.

The LS Update messages make it possible to receive data about the routers making up the network, while the LS Request messages make it possible to request data about the routers.

In compliance with the OSPF protocol, each router has a routing table that makes it possible to forward correctly the messages that it receives. Because of the dynamic aspect of the network, the routing tables must be constantly updated.

These updates are effected in particular by exchanging messages containing fragmentary information about the network and referred to as Link State Advertisement (LSA) messages. The routing tables are calculated by each router on the basis of this data.

The LS Update messages are in fact collections of LSA fragmentary data.

A third type of message is the Database Description Packet (DDP) message. These messages make it possible for two routers to exchange LSA summary lists, i.e. descriptions of the contents of their databases.

The various messages are described more fully in above-mentioned RFC 2328.

In the OSPF protocol, provision is also made to associate a state machine with each router that is a neighbor of a router.

FIG. 1 represents such a state machine. As is conventional, the circles represent the states which the interface can occupy. At any given time, the interface must be in one of these states. Each arrow in the diagram represents a transition from one state to another. The names of the states are given in the diagram, as they appear in RFC 2328.

The initial state of the state machine is represented by the circle referenced "Down".

When the router receives a "Hello" message, the "Hello Received" event is generated and the state machine goes to an "Init" state. The "Start" event is generated when a "Hello" message must be generated firstly by the router, in a non-broadcast multiple access network. In which case, the state machine goes to the "Attempt" state. A "Hello" message being received in response then generates a "Hello Received" event, and the state machine goes to the "Init" state.

As a function in particular of the connection and of the status of the router, the arrival of a "2-way Received" event causes the state machine to go either to an "ExStart" state or to a "2-way" state.

The "2-way" state is reached when the type of connection does not need adjacency to be formed between the two routers. This applies, for example, if they are members of a multi-access network and if neither of the two routers is a designated router. This state is a stable state but it can be called into question by the arrival of a "1-way Received" event indicating that the connection between the two routers has encountered a problem, and that the state machine must return to the "Init" state.

The "ExStart" state is reached when it is necessary to put the two routers into adjacency. During this state, the router negotiates with its counterpart in order to determine a master and a slave, by sending DDP messages without data.

Once this negotiation has been performed, a "Negotiation-Done" event occurs and the state machine goes to the "Exchange" state.

During this state, the two routers exchange DDP messages. Once the two routers have exchanged the description of all of their data, the "ExchangeDone" event occurs.

There are then two possibilities:

either both routers have the same data about the network; they are thus in adjacency, and the state machine goes to the "Full" state;

or else there is divergence, and the router that has the least up to date data makes a request (LS Request) to the other router to transmit a data exchange message in order to update its data; for this purpose, the state machine goes to the "Loading" state.

Conventionally, when a router system is re-started, e.g. after a failure, the state machine thus has to re-start in the "Down" state. The other router is then warned of this change, and it can also be subjected to a change of state.

Clearly, a state machine following the path once again from the "Down" state to an end state such as "2-way" or "Full"

takes a long time and can generate heavy traffic over the network (exchanging DDP messages, etc.).

In order to minimize the consequences of the router failing or of it being shut down temporarily for maintenance purposes, it is possible to provide for redundancy in the routers: a router on standby becomes active when the active router stops, e.g. after a failure or after an intentional shut down for maintenance.

Such a solution is, in particular, implemented by Cisco, in the Hot Standby Router Protocol (HSRP).

Another redundancy solution is described in IETF's RFC 2338, entitled "Virtual Router Redundancy Protocol".

However, in that solution as well, when a first router in the active state fails and causes the standby second router to take over, the state machines managing the routers that are neighbors of the router in question must re-start in the "Down" state.

That results in the second router being unavailable for a time lapse before it can return to the state in which the first router was before it failed or stopped. Conventionally, that delay is at least 40 seconds and is generally about 1 minute.

The state machines re-starting also suffers from the drawback of causing changes in the states of the neighboring routers.

OBJECTS AND SUMMARY OF THE INVENTION

An object of the invention is to mitigate those drawbacks. To this end, the invention provides a router made up:

firstly of at least two router modules, only one of which is in an active state at any given time, the others being in a standby state; and secondly of changeover means making it possible to cause one of said other router modules to go from a standby state to an active state when the router module in the active state stops.

The router is connected to neighbor routers, and said router modules have state machines associated with each of said neighbor routers.

In this router, each of said router modules further has:

data storage means which, in the active state, enable it to store data relating to the states of the state machines, when said machines are in stable states; and data retrieval means for retrieving said data when the router module changes over to the active state.

Thus, by means of the data storage, the router module in the standby state is capable of taking over in the same state as the state in which the router module in the active state was before it stopped or failed.

The changeover from the active router module to the standby module takes place transparently for the other routers of the network, and without generating any delay due to non-availability.

BRIEF DESCRIPTION OF THE DRAWINGS

The invention and its advantages appear more clearly from the following description of an implementation, given with reference to the accompanying figures, in which.

MORE DETAILED DESCRIPTION

Figure 3:
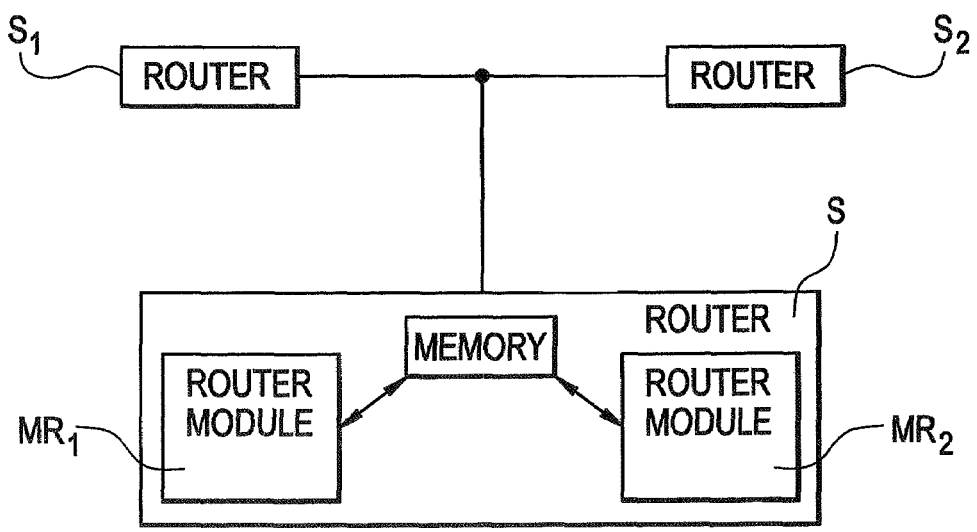
FIG. 3 shows a multi-access network made up of three routers.

FIG. 3 shows that the router S comprises two router modules $MR_1$ and $MR_2$. These two router modules perform the same functions as the routers of the state of the art.

However, in addition, the two router modules have means for communicating between each other.

More precisely, each of the router modules $MR_1$ and $MR_2$ has data storage means for storing data relating to the states of its state machines, when said state machines are in stable states, and data retrieval means for retrieving said data. As explained below, these data storage means may be means for writing in a shared memory M, and the data retrieval means may be means for reading from said shared memory M. However, other implementations of the invention are possible, in particular by using a software bus such as a Common Object Request Broker Architecture (CORBA) bus.

At any given time, only one of the two router modules is in the active state, i.e. is performing its router function. The other router module is in the standby state, i.e. it is invisible to the network but it is ready to take over the function of the active router module if said active router module fails or is shut down.

Data storage is implemented only by the router module in the active state, each time the state machine enters a stable state.

These stable states may be the "Down", "Init", "Extart", "2-way", "Exchange", "Full", and "Loading" states, i.e. the states for which the connection is determined.

In an implementation of the invention, the state of the state machine after a DDP message exchange is added to this list.

As mentioned above, once in the "Exchange" state, the router module exchanges DDP messages with its neighbor. This additional state is the state of the state machine when the associated neighboring router has performed an exchange of messages with the same sequence number, i.e. when it has received a DDP message and has sent a DDP message.

Figure 1:
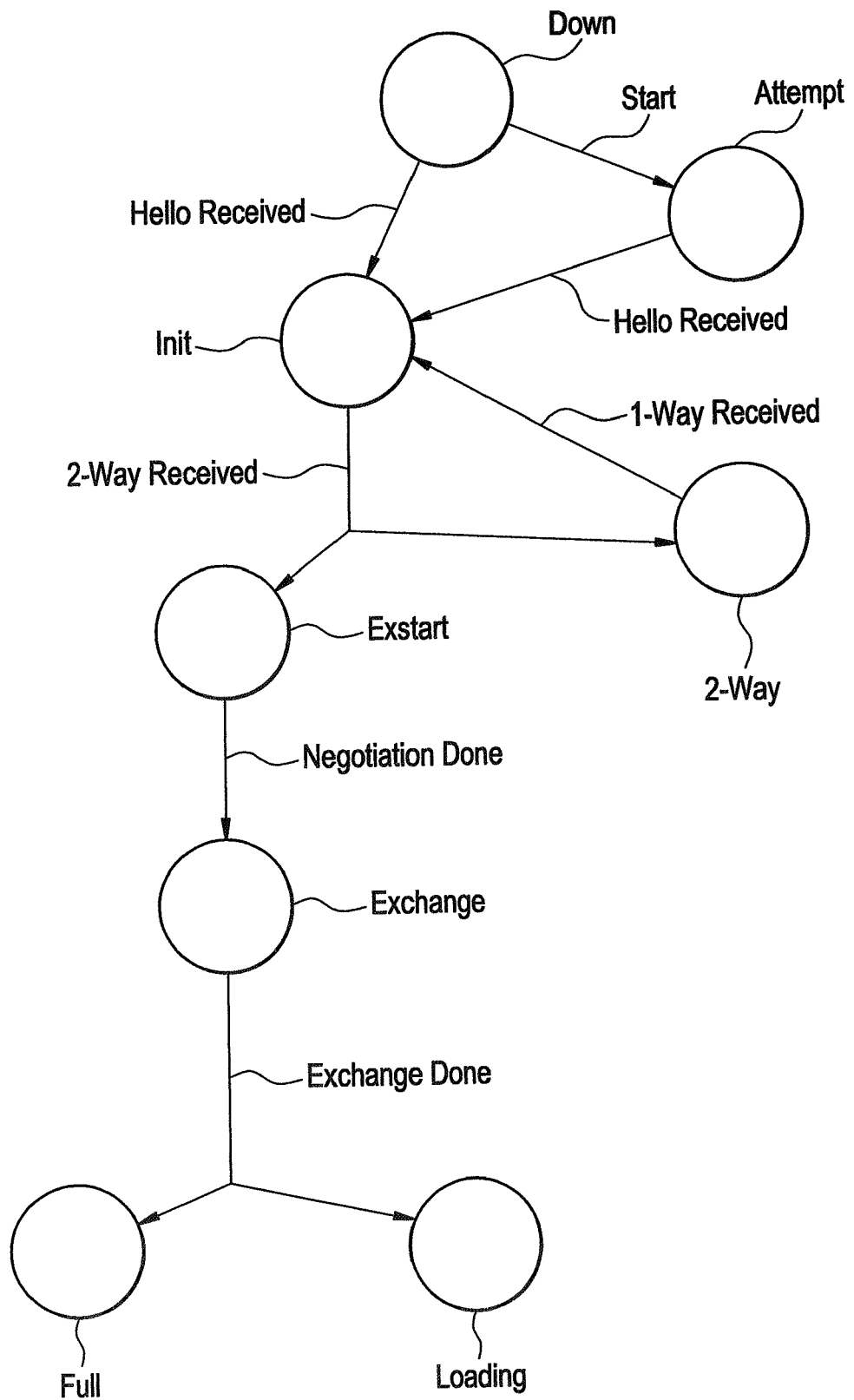
FIG. 1 (already described) shows the state machine managing communications associated with a neighboring router.
Figure 2:
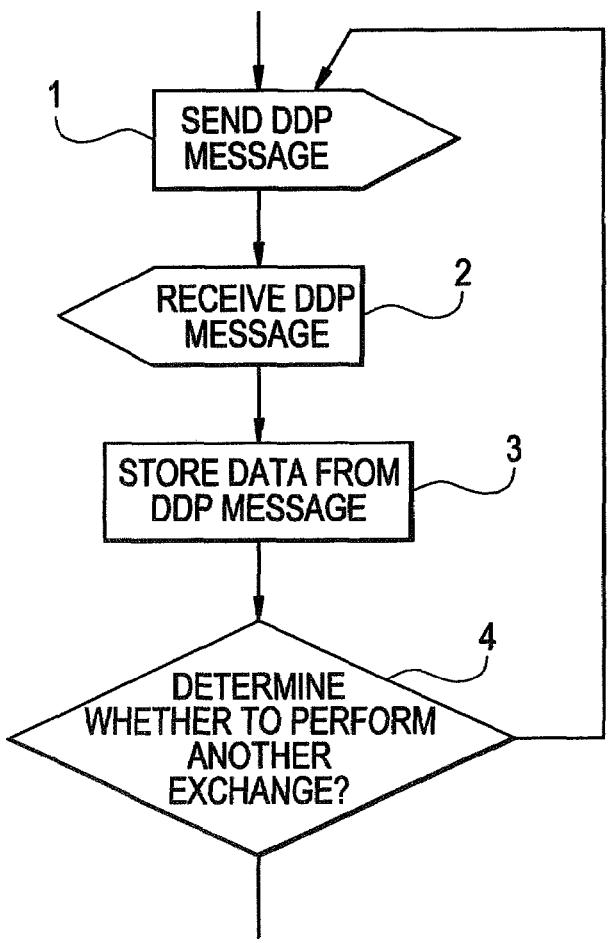
FIG. 2 shows in detail the "Exchange" state of the invention.

This additional state is shown in FIG. 2, which shows in detail the "Exchange" state. In this state, the router module sends a DDP message in a send step represented by box 1, and receives a DDP message in a receive step represented by box 2. The two DDP messages have the same sequence number. The order of these two steps depends on the status of the router module, i.e. whether it is master or slave in the exchange.

After the exchange, the data transmitted via the DDP messages is stored in a step represented by box 3. Then, a step referenced 4 consists in testing whether another exchange should be implemented.

The data to be stored contains at least one identifier for identifying the state of the state machine. However, it is possible also to store other data in order to facilitate starting up the standby router module when necessary.

In an implementation of the invention, data relating to the neighboring routers is stored when creating the state machines and when deleting them. This data is the data making it possible to create the state machine in compliance with Section 10 of above-mentioned RFC 2328.

In an implementation of the invention, when the state machine is in the "Full" state, any LS Update message received is stored.

FIG. 3 shows a particular implementation using a shared memory.

In this implementation, the router S has two neighbors $S_1$ and $S_2$. Therefore, each of the router modules $MR_1$ and $MR_2$ has two state machines, one associated with the neighbor $S_1$ and the other associated with the neighbor $S_2$.

In the example, it is assumed that the router $S_1$ was previously elected as the designated router. Thus, the router S must enter into adjacency with the router $S_1$. Therefore, in the router S, the state machine associated with the router $S_1$ is in the "Full" state, and the state machine associated with the router $S_2$ is in the "2-way" state.

Since these are stable states, as defined above, a state identifier is stored by the router module in the active state (e.g. $MR_1$) in the shared memory M.

When the router module $MR_1$ becomes non-operational, e.g. when it is shut down for maintenance or when it fails, the router module $MR_2$ goes from the standby state to the active state.

Whereupon the router module $MR_2$ can read back firstly the data relating to the states of both state machines, and secondly the data relating to the neighbor routers, as stored when the state machines were created.

Thus, the router module $MR_2$ knows that it must force the state machine associated with the router $S_1$ to go to the "Full" state, and that it must force the state machine associated with the router $S_2$ to go to the "2-way" state.

The router module $MR_2$ can then take over the function of the router module $MR_1$ very quickly and also transparently for the other router modules of the network.

Other implementations are naturally accessible to the person skilled in the art. In particular, the two router modules may communicate via inter-process communications means. For example, the inter-process communications means may be a software bus, such as the CORBA software bus in compliance with the specifications of the Object Management Group (OMG).

The data storage step may then be preceded by a data sending step in which the data is sent to the router module on standby, which module then has to store the data so that it can be retrieved when a state transition occurs.

The invention claimed is:

1. A router comprising at least two router modules, only one of which is in an active state at any given time, the other router modules being in a standby state, and changeover means which causes one of said other router modules to go from a standby state to an active state when the router module in the active state stops, said router being connected to neighbor routers, and said at least two router modules having respective state machines associated with each of said neighbor routers, wherein each of said router modules further has data storage means which, in the active state, enable it to store data relating to the states of the state machines, when said machines are in stable states, and data retrieval means for retrieving data relating to the states of the state machines when the router module changes over to the active state.

2. A router according to claim 1, in which said data is stored by a shared memory that is shared between said router modules.

3. A router according to claim 1, further comprising inter-process communications means enabling said router modules to communicate data to be stored with one another.

4. A router according to claim 3, in which said inter-process communications means are a Common Object Request Broker Architecture (CORBA) software bus.

5. A router according to claim 3, wherein the data storage means of the router module in a standby state are operable to store said data to be stored that is received via the inter-process communications means.

6. A router according to claim 5, wherein the data to be stored includes data relating to the states of the state machines.

7. A router according to claim 6, wherein the data to be stored further includes data for facilitating starting up of the router module that goes from a standby state to an active state when the router module in the active state stops.

8. The router according to claim 1, in which each of said router modules further has means for storing data relating to an associated neighbor router when said associated neighbor router is created, and means for retrieving data relating to an associated neighbor router when said router module changes over to the active state.

9. The router according to claim 1, in which a stable state is a state from the following list: "2-way", "Exchange", "Full", and "Loading".

10. A router according to claim 9, in which said list further includes the state of the machine after a Database Description Packet exchange.

11. The router according to claim 9, in which each of said router modules has means for storing any data transmission message received, even though the respective state machine is in the "Full" state.

12. The router according to claim 1, in which the router module in the active state is operable to store other data in order to facilitate starting up the router module that goes from the standby state to the active state when the router module in the active state stops.

13. An Internet Protocol network, including a router according to claim 1 and at least one neighbor router connected to said router.

14. A method for operating a router connected to at least one neighbor router, comprising the steps of:
providing a first router module being in an active state and having at least one first state machine respectively associated with said at least one neighbor router and a second router module being in a standby state and having at least one second state machine respectively associated with said at least one neighbor router,
storing data relating to at least one stable state of said at least one first state machine,
changing the second router module over to go to an active state in response to the first router module failing or stopping, and
retrieving said data relating to the at least one stable state of the at least one first state machine and forcing the at least one second state machine to respectively go to said at least one stable state.

15. The method according to claim 14, in which the data relating to the at least one stable state of the at least one first state machine is stored in and retrieved from a shared memory that is shared between said first and second router modules.

16. The method according to claim 14, further comprising the step of communicating the data relating to the at least one stable state of the at least one first state machine between said first and second router modules through inter-process communications means.

17. The method according to claim 16, in which said inter-process communications means include a Common Object Request Broker Architecture (CORBA) software bus.

18. The method according to claim 14, further comprising the steps of:
storing data relating to an associated neighbor router when said associated neighbor router is created while the first router module is in the active state, and retrieving said data relating to the associated neighbor router for the second router module when said second router module changes over to the active state.

19. The method according to claim 14, in which a stable state is a state from the following list: "Down", "Init", "Exstart", "2-way", "Exchange", "Full", and "Loading".

20. The method according to claim 14, further comprising the steps of:

exchanging Database Description Packets having a same sequence number between said first router module being in an active state and a neighbor router, and storing data relating to the state of the first state machine associated to said neighbor router after said Database Description Packets exchange.

21. The method according to claim 14, further comprising the steps of:

receiving a data transmission message from a neighbor router at said first router module being in an active state, while the first state machine associated to said neighbor router is in a "Full" state, and storing said data transmission message.

22. The method according to claim 14, further comprising the steps of:

retrieving data previously stored by the first router module in response to the second router module changing over to the active state, and using said data for facilitating starting up of the second router module.

23. The method according to claim 14, further comprising the steps of:

sending the data relating to at least one stable state of said at least one first state machine from the first router module being in the active state to the second router module being in the standby state.

24. A method for operating an Internet Protocol network comprising a router connected to at least one neighbor router, the method comprising the steps of:

providing the router with a first router module being in an active state and having at least one first state machine respectively associated with said at least one neighbor router and a second router module being in a standby state and having at least one second state machine respectively associated with said at least one neighbor router, exchanging messages of the Open Shortest Path First protocol between the first router module and a neighbor router, placing a first state machine associated to said neighbor router in a stable state in response to said exchange of messages storing data relating to said stable state of said first state machine, changing a second state machine over to go to an active state in response to the first router module failing or stopping, retrieving said data relating to the stable state of the first state machine and forcing the second state machine associated to said neighbor router to go to said stable state, and exchanging messages of the Open Shortest Path First protocol between the second router module and said neighbor router.

* * * * *